US012738598B2

(12) United States Patent
Adams et al.

(10) Patent No.: US 12,738,598 B2
(45) Date of Patent: Sep. 15, 2026

(54) SEPARATORS FOR AQUEOUS ZINC-ION CELLS AND BATTERIES, ZINC METAL BATTERIES, AND METHODS OF FABRICATING A SEPARATOR FOR USE IN A ZINC METAL BATTERY

(71) Applicant: Salient Energy Inc., Dartmouth (CA)

(72) Inventors: Brian D. Adams, Dartmouth (CA); Marine B. Cuisinier, Dartmouth (CA); Susi Jin, Richmond Hill (CA); John Philip S. Lee, Dartmouth (CA); Kendal Wilson, Lake Echo (CA); Haonan Yu, Halifax (CA)

(73) Assignee: Salient Energy Inc., Dartmouth (CA)

( * ) Notice: Subject to any disclaimer, the term of this patent is extended or adjusted under 35 U.S.C. 154(b) by 700 days.

(21) Appl. No.: 18/011,420

(22) PCT Filed: Jun. 17, 2021

(86) PCT No.: PCT/CA2021/050831

§ 371 (c)(1),
(2) Date: Dec. 19, 2022

(87) PCT Pub. No.: WO2021/253128

PCT Pub. Date: Dec. 23, 2021

(65) Prior Publication Data

US 2023/0238650 A1 Jul. 27, 2023

Related U.S. Application Data

(60) Provisional application No. 63/040,469, filed on Jun. 17, 2020.

(51) Int. Cl.

*H01M 50/449* (2021.01)
*H01M 4/42* (2006.01)

(Continued)

(52) U.S. Cl.

CPC ........... *H01M 50/449* (2021.01); *H01M 4/42* (2013.01); *H01M 10/44* (2013.01);

(Continued)

(58) Field of Classification Search

CPC ...... H01M 50/449; H01M 4/42; H01M 10/44; H01M 50/403; H01M 50/434;

(Continued)

(56) References Cited

U.S. PATENT DOCUMENTS

| | | | | |
|---|---|---|---|---|
| 6,372,387 B1 * | 4/2002 | Kawakami | ............ | H01M 10/24 429/188 |
| 8,541,129 B1 * | 9/2013 | Gerald | ................ | H01M 50/491 429/251 |

(Continued)

FOREIGN PATENT DOCUMENTS

| | | | | |
|---|---|---|---|---|
| CN | 110690512 A | 1/2020 | | |
| WO | WO-2019095075 A1 * | 5/2019 | .......... | H01M 4/0435 |
| WO | 2020086838 A1 | 4/2020 | | |

OTHER PUBLICATIONS

CIPO as ISA, International Search Report and Written Opinion for PCT/CA2021/050831, Sep. 17, 2021.

(Continued)

*Primary Examiner* — Daniel S Gatewood

(74) *Attorney, Agent, or Firm* — Own Innovation; James W. Hinton; Daniel Biggs

(57) ABSTRACT

Separators for zinc metal batteries, zinc metal batteries, and methods of fabricating a separator for use in a zinc metal battery are provided. The separator includes a hydrophilic membrane having a first side for facing a negative electrode when arranged in the zinc metal battery and a second side for facing a positive electrode when arranged in the zinc metal battery. The hydrophilic membrane includes a plurality of pores traversing the hydrophilic membrane from the first (Continued)

side to the second side enabling flow of zinc cations between the negative electrode and the positive electrode through the separator. Each of the pores may have a pore size ranging from about 0.1 to 1.3 μm.

19 Claims, 5 Drawing Sheets

(51) Int. Cl.
*H01M 10/44* (2006.01)
*H01M 50/403* (2021.01)
*H01M 50/434* (2021.01)
*H01M 50/491* (2021.01)

(52) U.S. Cl.
CPC ....... *H01M 50/403* (2021.01); *H01M 50/434* (2021.01); *H01M 50/491* (2021.01)

(58) Field of Classification Search
CPC ............. H01M 50/491; H01M 50/417; H01M 50/423; H01M 50/4295; H01M 50/446; H01M 10/38; H01M 2300/0005; H01M 50/44; H01M 50/489; H01M 10/054; H01M 10/36; Y02E 60/10; Y02P 70/50
See application file for complete search history.

(56) References Cited

U.S. PATENT DOCUMENTS

2016/0013463 A1* 1/2016 Roumi .................. H01M 10/48 429/145
2021/0126261 A1 4/2021 Yu

OTHER PUBLICATIONS

European Patent Office, Extended European Search Report for EP 21825962.0, dated Jun. 12, 2025.

* cited by examiner

500

SEPARATORS FOR AQUEOUS ZINC-ION CELLS AND BATTERIES, ZINC METAL BATTERIES, AND METHODS OF FABRICATING A SEPARATOR FOR USE IN A ZINC METAL BATTERY

TECHNICAL FIELD

The embodiments disclosed herein relate to electrochemical cells (hereafter, cells) that use metallic zinc as the negative electrode and more specifically to the membrane which separates the negative electrode and positive electrode.

INTRODUCTION

Primary and secondary electrochemical cells employing zinc metal have been used in commercial applications for well over a century. Zinc is inexpensive, non-toxic, is stable in water due to a high overpotential for hydrogen evolution and has a low redox potential (−0.76 V vs. standard hydrogen electrode (SHE)) compared to other negative electrode materials used in aqueous batteries.

The most common of these cells have been primary (i.e. non-rechargeable) cells that use an alkaline electrolyte and a metal oxide positive electrode material that reacts with hydroxide ions in the electrolyte. To allow for this type of reaction, the battery must employ a very alkaline electrolyte. However, the use of an alkaline electrolyte limits the rechargeability of the cell. Therefore, developing a zinc-based battery that operates in a neutral or acidic pH electrolyte is of significant interest because it may provide improved rechargeability. Modern examples of rechargeable zinc cells operating with electrolytes having pH<7 include zinc-air, zinc-ion, zinc-bromide, zinc-iodide, zinc-iron and zinc-cesium.

Cells utilize a porous membrane as a separator between the negative and positive electrode to prevent short-circuits while allowing transport of ions across the membrane. For alkaline cells mentioned above, the transport species in the electrolyte is the hydroxide ion ($OH^-$) or the zincate ion ($(Zn(OH)_4)^{2-}$). In neutral or acidic electrolytes, the transport species is either $H^+$ or $Zn^{2+}$. Since most of these new battery chemistries (zinc-air, zinc-ion, zinc-bromide, zinc-iodide, zinc-iron and zinc-cesium) are not widely commercialized and are still in the R&D stage, membranes are not optimized for usage in a cell, but rather repurposed from other technologies (e.g. Pb-acid or Li-ion). Since these membranes are not optimized for their usage, improvements can be made to cater separator membranes to suit their target application, specifically cells employing neutral or acidic aqueous electrolytes.

Many commercially available, mass produced separators designed for use in Li-ion batteries exist as hydrophobic membranes which repel water since the electrolyte consists of an organic solvent rather than water. However, aqueous cells are comprised of a water-based electrolyte and thus repulsion of water limits transportation of ions through the membrane. On the other hand, Pb-acid batteries, which do comprise an aqueous, acidic electrolyte, utilize separators that are specifically designed to transport protons ($H^+$) and resist short circuits caused by growth of lead (Pb) or lead sulfate ($PbSO_4$) crystals through the separator material. Therefore, it is desired to design a separator for new zinc battery chemistries which can be wetted properly by the electrolyte, have good transport of $Zn^{2+}$ through the membrane, and prevent short circuits caused by zinc growth from the negative to positive electrode. The properties required are thus different from any other commercially available separator designed for other battery chemistries.

For stationary energy storage applications that are especially relevant for new rechargeable zinc battery chemistries, higher rate capabilities are necessary to supply power quickly. Likewise, these cells cycle at varying C-rates (2C to C/10) therefore it is important to modify membranes to enable cells to cycle at desired C-rates. This means optimizing the separator to transport $Zn^{2+}$ quickly from one electrode to the other. In addition to rate capabilities, it is important to improve the coulombic efficiency which is a measure of charge transfer efficiency. A higher coulombic efficiency would lead to better cell cycling which indicates an increase in number of charge and discharge cycles and thus improvement in cycle life.

Accordingly, there is a need for hydrophilic battery separators for use in electrochemical cells which can transport $Zn^{2+}$ efficiently and resist puncture by zinc metal causing catastrophic failure by short circuit.

SUMMARY

A separator for use in a zinc metal battery to prevent physical contact between a negative electrode and a positive electrode of the zinc metal battery, wherein the zinc metal battery includes an aqueous electrolyte having a pH less than 7, is provided. The separator includes: a hydrophilic membrane having a first side for facing the negative electrode when arranged in the zinc metal battery and a second side for facing the positive electrode when arranged in the zinc metal battery, the hydrophilic membrane including a plurality of pores traversing the hydrophilic membrane from the first side to the second side enabling flow of zinc cations between the negative electrode and the positive electrode through the separator.

Each of the plurality of pores may have a pore size within the range of 0.1 to 1.3 μm. The pore size may be defined as an average diameter of the respective pore.

The hydrophilic membrane may comprise a woven polymer.

The hydrophilic membrane may comprise a non-woven polymer.

The hydrophilic membrane may comprise any one or more of polyethylene, polypropylene, polyester, polypropylene, polyvinylchloride, polytetrafluoroethylene, polyimide, polyamide, polyaramid, rubber, asbestos, cellulose, and glass fiber.

The hydrophilic membrane may be mixed or functionalized with a ceramic material for increasing hydrophilicity of the hydrophilic membrane.

The ceramic material may be $SiO_2$ or $Al_2O_3$.

The hydrophilic membrane may have a porosity of 20-90% and a tortuosity of 1-5.

The hydrophilic membrane may have a mechanical strength of 20-1500 gram-force resistance. This mechanical strength may withstand puncture from zinc metal.

The hydrophilic membrane may have a high wettability with a contact angle less than 90° and a wicking time from 0s-20 mins.

The hydrophilic membrane may be treated to increase hydrophilicity using an oxidative treatment.

The oxidative treatment may be any one or more of a plasma gas treatment, an acid treatment, and a radiation induction treatment.

The hydrophilic membrane may include a plurality of molecules grafted onto one or more surfaces of the separator that contact the electrolyte when arranged in the zinc metal battery.

The plurality of molecules may be grafted onto the surface after the oxidative treatment using a grafting treatment.

The treatment to increase hydrophilicity may be a single step process.

The treatment to increase hydrophilicity may be a multi-step process.

The treatment to increase hydrophilicity may be a batch process.

The batch process may include a bench top process.

The treatment to increase hydrophilicity may be a continuous process.

The continuous process may include a roll-to-roll process or a reel-to-reel process.

The oxidative treatment may include an aqueous bath containing any one or more of persulfate ($S_2O_8^{2-}$), hydrogen peroxide ($H_2O_2$), and ozone ($O_3$) oxidant.

One or more of UV light, $TiO_2$, $OH^-$, or $H^+$ may be used to assist or enhance the oxidative process.

The plurality of molecules may be grafted onto the surface using a grafting treatment, wherein the grafting treatment includes water insoluble organic molecules or water insoluble inorganic molecules that have one or more functional groups including any one or more of an $OH^-$ group, a $NH_2$ group, a $CH_3COO^-$ group, a siloxane (SiO), $SO_4^{2-}$, $CO_3^{2-}$, $NO_3^-$, a carbonyl, and a carboxy.

The water insoluble organic molecules or water insoluble inorganic molecules may be rendered water insoluble using a crosslinker.

The oxidation treatment and the grafting treatment may be performed at a temperature of 20±5° C.

The oxidation treatment and the grafting treatment may be performed at a constant temperature between 20 and 80° C.

The oxidative treatment may be a plasma treatment, and the plasma treatment may include passing a membrane through a plasma gas to render the membrane hydrophilic.

The plasma gas may be $O_2$, $N_2$, Ar, He, or $H_2$.

The oxidative treatment may be an acid treatment, and the acid treatment may include soaking the hydrophilic membrane in 0.1M to 30M acid solution for a time period in the range of 1 minute to 24 hours.

The acid solution may include HCl, $H_2SO_4$, HF, $H_2CO_3$, $HNO_3$, $H_3PO_4$, $C_2H_4O_2$, $HClO_4$, or HI.

The oxidative treatment may be a radiating induction treatment including exposure of the membrane to radiation as an initiation process to graft molecules onto the surface.

The radiation may be gamma radiation, alpha radiation, UV radiation, or electron beam radiation.

The hydrophilic membrane may include a plurality of hydrophilic membrane layers.

A zinc metal battery is also provided including the separator described above arranged between a negative electrode and a positive electrode, the negative and positive electrodes ionically connected by an electrolyte.

A zinc metal battery is provided. The zinc metal battery includes an electrolyte having a pH less than 7. The zinc metal battery includes a negative electrode, a positive electrode, the electrolyte ionically connecting the negative electrode and positive electrode, and a separator arranged between the positive electrode and negative electrode. The separator includes a hydrophilic membrane having a first side for facing the negative electrode when arranged in the zinc metal battery and a second side for facing the positive electrode when arranged in the zinc metal battery, the hydrophilic membrane including a plurality of pores traversing the hydrophilic membrane from the first side to the second side enabling flow of zinc cations between the negative electrode and the positive electrode through the separator.

Each of the plurality of pores may have a pore size within the range of 0.1 to 1.3 μm. The pore size may be defined as an average diameter of the respective pore.

The negative electrode may comprise a layer of zinc metal.

The negative electrode may be a zinc alloy.

The electrolyte may comprise a zinc salt dissolved in water or water and a co-solvent to form a salt solution.

The salt solution may comprise 0.1 to 10 molar zinc ions in the form of the zinc salt.

The zinc salt may be zinc sulfate, zinc acetate, zinc citrate, zinc iodide, zinc chloride, zinc perchlorate, zinc bis(trifluoromethanesulfonyl)imide, zinc nitrate, zinc phosphate, zinc triflate, zinc tetrafluoroborate, or zinc bromide.

The electrolyte may have a pH less than 7.

The electrolyte may have a pH in the range of 4-6.

The positive electrode may be an air electrode, an intercalation electrode, a conversion electrode, or an inert substrate at which redox molecules dissolved in the electrolyte can reduce/oxidize.

The hydrophilic membrane may comprise a plurality of hydrophilic membrane layers.

The battery may be a rechargeable battery. The rechargeable battery may be a zinc-air battery, a zinc-ion battery, a zinc-halide battery, a nickel-zinc battery, a zinc-iron battery, or a zinc-cesium battery.

A method of fabricating a separator for use in a zinc metal battery is provided. The separator comprises a hydrophilic membrane having a first side for facing the negative electrode when arranged in the zinc metal battery and a second side for facing the positive electrode when arranged in the zinc metal battery, the hydrophilic membrane including a plurality of pores traversing the hydrophilic membrane from the first side to the second side enabling flow of zinc cations between the negative electrode and the positive electrode through the separator. The method includes treating a membrane using an oxidative treatment to increase hydrophilicity of the membrane and performing a grafting treatment on the membrane in which a plurality of molecules are grafted onto one or more surfaces of the hydrophilic membrane.

The oxidative treatment may include a plasma gas treatment.

The oxidative treatment may include an acid treatment.

The oxidative treatment may include a radiation induction treatment.

The oxidative treatment may be performed as a single step process.

The oxidative treatment may be performed as a multistep process.

The oxidative treatment may be performed as a batch process.

The batch process may include a bench top process.

The oxidative treatment may be performed as a continuous process including at least one of a roll-to-roll process and a reel-to-reel process.

The oxidative treatment may include using an aqueous bath containing one or more of persulfate ($S_2O_8^{2-}$), hydrogen peroxide ($H_2O_2$), and/or ozone ($O_3$) oxidant, and the method may further comprise using UV light, $TiO_2$, $OH^-$, or $H^+$ to assist or enhance the oxidative process.

The grafting treatment may include using a water insoluble organic molecule or a water insoluble inorganic molecule having one or more functional groups, wherein the one or more functional groups include an $OH^-$ group, a $NH_2^-$ group, a $CH_3COO^-$ group, a siloxane (SiO), $SO_4^{2-}$, $CO_3^{2-}$, $NO_3^-$, a carbonyl, or a carboxy.

The method may further include using one or more crosslinkers to render the water insoluble organic molecule or a water insoluble inorganic molecule water insoluble.

The oxidative treatment and the grafting treatment may be performed at a temperature of 20±5° C.

The oxidative treatment and the grafting treatment may be performed at a constant temperature between 20 and 80° C.

The plasma gas treatment may include passing the hydrophilic membrane through a plasma gas including any one or more of $O_2$, $N_2$, Ar, He, and $H_2$.

The acid treatment may include soaking the hydrophilic membrane in a 0.1M to 30M acid solution fora time period ranging from 1 minute to 24 hours.

The acid solution may include any one or more of HCl, $H_2SO_4$, HF, $H_2CO_3$, $HNO_3$, $H_3PO_4$, $C_2H_4O_2$, $HClO_4$, and HI.

The radiation induction treatment may include exposing the membrane to radiation as an initiation process for grating the plurality of molecules onto the one or more surfaces.

The radiation may be gamma radiation, alpha radiation, UV radiation, or electron beam radiation.

The method may further include mixing or functionalizing the hydrophilic membrane with a ceramic material to increase hydrophilicity of the hydrophilic membrane.

The ceramic material may be $SiO_2$ or $Al_2O_3$.

Each of the plurality of pores may have a pore size within the range of 0.1 to 1.3 μm. The pore size may be defined as an average diameter of the respective pore.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The present disclosure relates generally to improving the performance of primary and secondary electrochemical cells that use an aqueous electrolyte. In particular, the present disclosure relates to separators, including hydrophilic membranes, for use in aqueous zinc-ion cells and batteries. The separator of the present disclosure may advantageously provide for proper wetting of the separator by the aqueous electrolyte, provide good transport of $ZN^{2+}$ through the separator, and improve prevention of short circuits caused by zinc growth from the negative electrode to the positive electrode.

As used herein, the term "between", when used in reference to a range of numerical values such as a size range or a pH range, means the range inclusive of the lower limit value and upper limit value (i.e. the endpoints of the range), unless otherwise stated. For example, a pH range of "between 4 to 6" is taken to include pH values of 4.0 and 6.0. Further, and more generally, any range of numerical values provided herein is taken to mean the range inclusive of the lower limit value and upper limit value, unless otherwise specified.

Figures 1A, 1B:
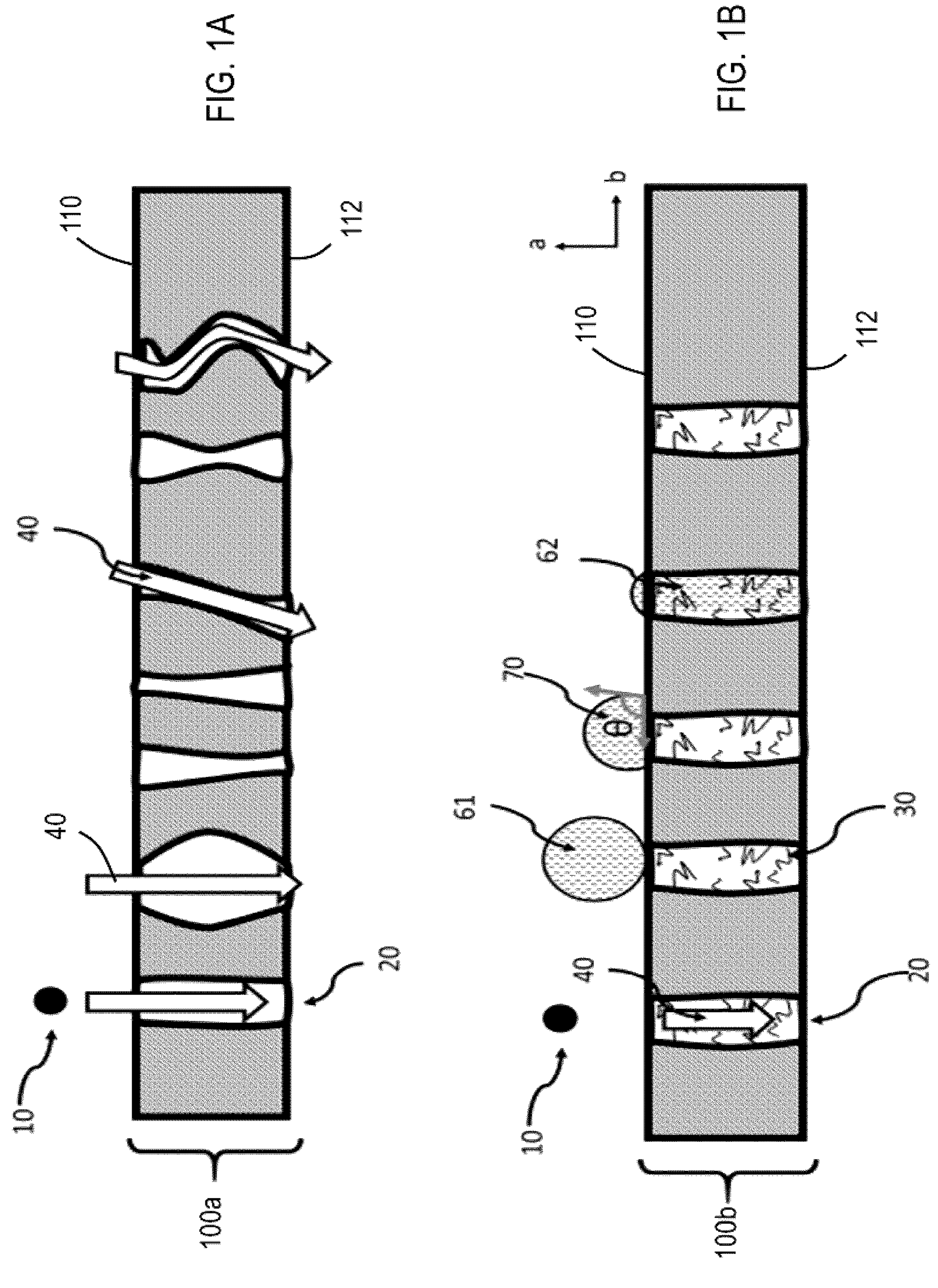
FIG. 1A is a two dimensional cross section view of a membrane for use as a separator in a zinc metal battery including a plurality of pores having different pore geometries and demonstrating flow of a zinc cation through a length of the pore, according to an embodiment.
FIG. 1B is a two dimensional cross section view of a membrane for use as a separator in a zinc metal battery including a plurality of pores that have been functionalized with molecules to increase hydrophilicity of the membrane and demonstrating flow of a zinc cation through a length of the pore and a drop of electrolyte on the surface where the contact angle can be measured and electrolyte can pass through the pores in the membrane, according to an embodiment.

Referring now to FIGS. 1A and 1B, shown therein are cross-sections of membranes 100*a*, 100*b* for use as a separator in a zinc metal battery, according to embodiments. The membranes 100*a*, 100*b* may be referred to generically throughout the present disclosure as membrane 100 or separator 100. The term membrane 100 or separator 100 (or other similar term), as used herein, is intended to refer to a membrane or separator which may include any or all of the features or properties of membranes 100*a*, 100*b*, or any other features or properties described herein.

In particular, FIG. 1A illustrates different pore geometries (e.g. illustrating different tortuosities) and FIG. 1B illustrates a membrane in which pores thereof have been functionalized with molecules. The representations shown in FIGS. 1A and 1B are generalized representations and are not drawn to scale.

FIGS. 1A and 1B show a two-dimensional cross-section of the membrane 100 (also referred to as "separator 100") demonstrating flow 40 of a zinc cation 10 through a length of a pore 20 in the membrane 100. The membrane 100*b* of FIG. 1B is shown to have pores 20 that have been functionalized with molecules 30 to increase hydrophilicity. The membrane 100*a* of FIG. 1A may be functionalized in similar manner to the membrane 100*b* of FIG. 1B (though not shown in FIG. 1A). In FIG. 1B, a drop of electrolyte 61 is shown on the surface of the separator 100 where a contact angle 70 can be measured and electrolyte can pass through the pores 20 (shown at 62).

The separator 100 comprises a membrane (separator 100 may be referred to interchangeably as membrane 100 herein). In variations, the membrane may include one or more layers of membrane (membrane layers, or layers). In embodiments where the separator 100 includes a plurality of membrane layers, the respective layers may have the same properties or may have different properties. The membrane 100 may be treated, such as through oxidative and grafting treatments, to increase hydrophilicity of the membrane 100.

The separator 100 includes a plurality of pores 20. The pores 20 extend through the separator 100 from a first edge 110 (or side 110, or surface 110) of the separator 100 to a second edge 112 (or side 112, or surface 112) of the separator 100, such that the pores 20 traverse the separator 100. When the separator 100 is arranged in a cell between a negative electrode and a positive electrode, the first edge 110 may face the negative electrode and the second edge 112 may face the positive electrode. The separator 100 is in physical contact with both the negative electrode and the positive electrode. This arrangement may enable the flow of zinc cations between the negative electrode and the positive electrode through the separator 100.

The pores 20 within the separator 100 may have different dimensions or configurations. For example, the pores 20 may have different widths and/or different paths 40 through the separator 100.

The tortuosity is a measure of the length of the path 40 through the separator 100 divided by the thickness of the membrane 100. The thickness of the membrane 100 can be defined as the distance between the first edge 110 and the second edge 112 of the membrane 100. Therefore, a tortuosity of 1 indicates a direct path 40 through the membrane 100 while any tortuosity greater than 1 indicates a winding path 40 through the membrane 100.

The pores 20 in the separator 100 may be modified to provide a change in hydrophilicity of the membrane 100. The pores 20 in the separator 100 may be modified by an activation method (oxidation) and may be functionalized with molecules 30 that can provide a change in hydrophilicity of the membrane 100. Hydrophilicity in this instance is the membrane's 100 attraction to water over repulsion of water (which is a hydrophobe or hydrophobic membrane).

The hydrophilicity of the membrane 100 can be monitored by the contact angle, which is a measure of the angle 70 of a drop of solvent or electrolyte (salt containing liquid, 61) depicted in FIG. 1B.

A hydrophobic membrane would have a contact angle greater than 90°, while a hydrophilic membrane will have a contact angle less than 90°.

Figure 2:
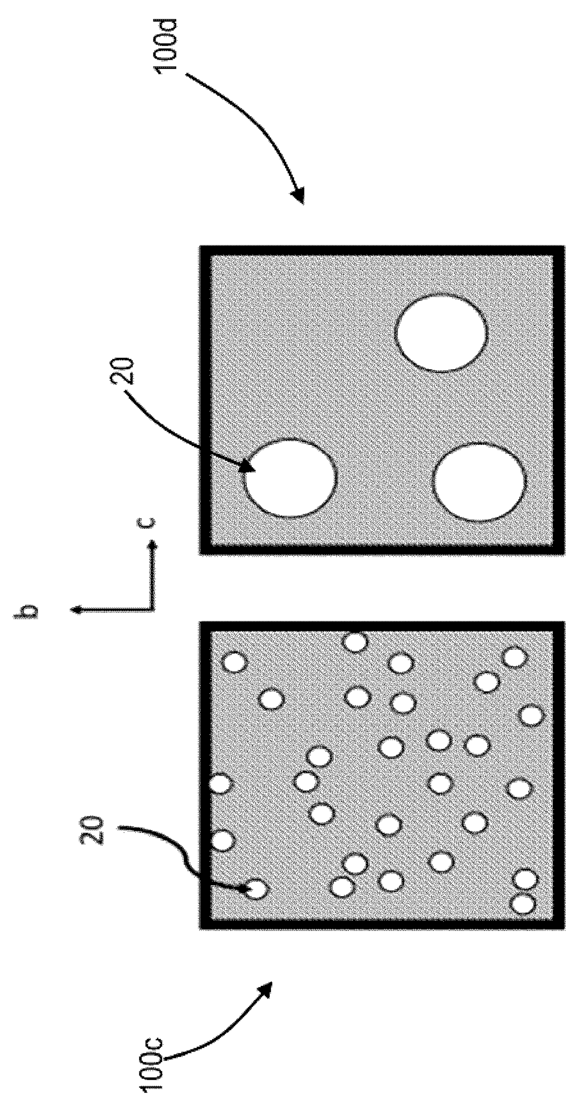
FIG. 2 shows a two dimensional top view of two separator membranes having different pore sizes, according to embodiments.

In a similar vein, in variations, the size or diameter of the pores 20 of the separator 100 may vary. Examples of such variation in pore size or pore diameter of the pores 20 is shown in FIG. 2. FIG. 2 illustrates a top view of first and second separator membranes 100*c*, 100*d*, according to examples. First and second separator membranes 100*c*, 100*d* are variations of separator 100 of FIG. 1. As can be seen, the pore size or pore diameter of the pores 20 in each of the first and second separator membranes 100*c*, 100*d* is different.

Varying the size or diameter of the pores 20 can impact porosity of the membrane 100. Porosity (porosity value) is a measure of the void volume of the membrane 100 not occupied by a solid material, (such as a polymer or ceramic) and which is filled with electrolyte in a cell. However, porosity values can be the same even between different pore sizes depending on the density or number of the pores 20 present in the membrane 100. Porosity of the membrane 100 may be optimized to balance between zinc ion transport (made better by more porosity) and providing a physical barrier to short circuits (made better by less porosity).

Figures 3A, 3B:
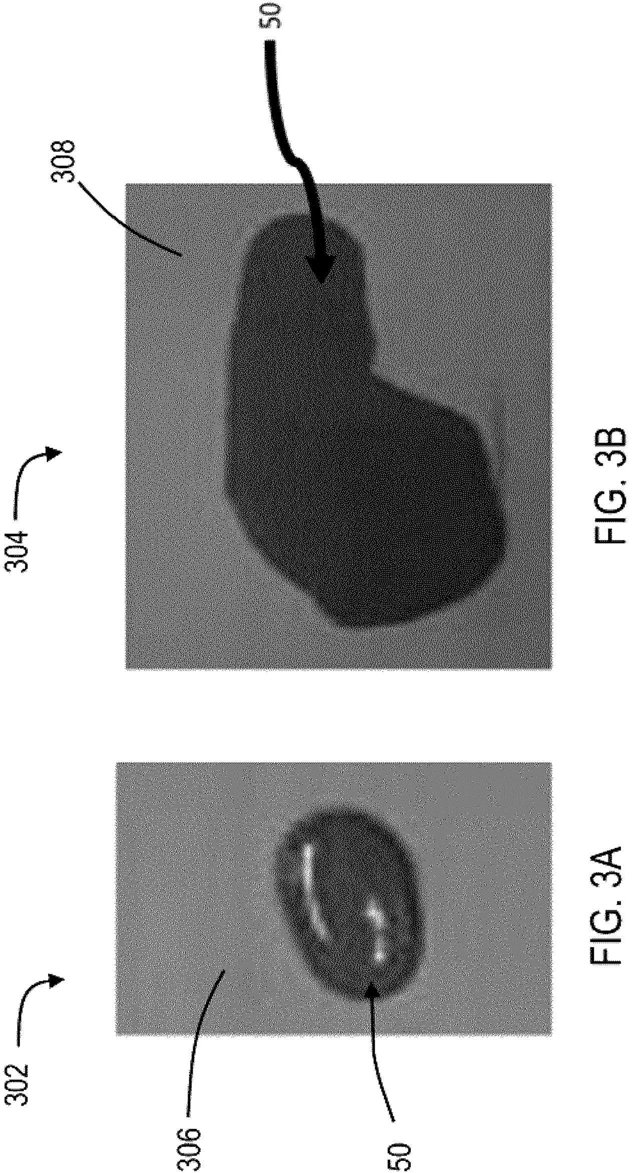
FIG. 3A is an image illustrating an untreated separator membrane with a drop of zinc sulfate in water electrolyte after 10 minutes of exposure, according to an embodiment.
FIG. 3B is an image illustrating a plasma treated separator membrane with a drop of zinc sulfate in water electrolyte after 10 minutes of exposure, according to an embodiment.

Referring now to FIGS. 3A and 3B, shown therein are images 302, 304 of membranes 306, 308 (e.g. membrane 100) with a drop of zinc sulfate in water electrolyte 50 after 10 minutes of exposure.

In particular, FIGS. 3A and 3B demonstrate a polyethylene/silica composite (PE/$SiO_2$) separator membrane 306 that is untreated (FIG. 3A) with a drop of electrolyte 50 (untreated membrane 306) compared to a polyethylene/silica composite (PE/$SiO_2$) separator membrane 308 after a plasma treatment (FIG. 3B) (treated membrane 308), each with a drop of electrolyte 50 applied thereto and each having sat after application of the drop of electrolyte 50 for 10 minutes.

The test of FIGS. 3A and 3B is to determine the ability for a membrane 100 to absorb a drop of liquid into the pores 20 until the contact angle is zero, known herein as wicking time or wicking. This is demonstrated in FIG. 1B which depicts an idealized representation of wicking, wherein the pore 20 absorbs a drop of electrolyte 61 into the pores 20. An example of the absorption of the drop of electrolyte 61 into the pores 20 is shown at 62 in FIG. 1B.

The treatment in FIGS. 3A and 3B demonstrates that the electrolyte 50 is wicked away within 10 minutes for treated membranes (e.g. membrane 308), indicating an increase in hydrophilicity of the treated membrane 308. The untreated membrane 306 has not wicked away the electrolyte 50 within 10 minutes, which indicates low hydrophilicity of the membrane 306. The electrolyte 50 used in this test was comprised of 2 M $ZnSO_4$ dissolved in water.

Therefore, these separators (e.g. separator 100) can be efficiently treated to increase hydrophilicity of the separator. Treatments may include, for example, any one or more of oxidation, acid treatment, plasma gas, radiation exposure, and the like. Such treatments may increase hydrophilicity of the separator by, for example, removing elements of the separator that are preventing water absorption or changing molecular structure of surface groups to make them more attracting of water.

In some cases, such treatment to increase hydophilicity of the separator 100 may be performed as an initial treatment step followed by an introduction of a molecule to graft onto the surface to further increase hydrophilicity of the separator 100. The "surface" referred to, and to which molecules may be grafted, may include any surface of the separator 100 that touches or contacts electrolyte. For example, the surface may include one or more faces or external surfaces of the separator 100 and one or more internal surfaces of the separator 100. The surface may include internal porosity.

Grafted molecules may include any one or more of polar functional groups such as hydroxides, amides, acetates, siloxanes, sulfates, nitrates, carbonates, carbonyl, carboxy, and the like. Further, appropriate crosslinkers may be added to the functional groups that are coating the separator 100 to render the coating water insoluble. The term "coating" refers to the coating applied to the surface of the separator to render the separator hydrophilic (or increase hydrophilicity).

The treatment to increase hydrophilicity of the separator membrane may be performed as a single step or multistep process.

The treatment to increase hydrophilicity of the separator membrane may be a batch process. The batch process may include a bench top process.

The treatment to increase hydrophilicity of the separator membrane may be a continuous process. The continuous process may include a roll-to-roll process or a reel-to-reel process.

In an embodiment, an oxidation treatment to increase hydrophilicity of the separator membrane may include using an aqueous bath containing one or more of persulfate ($S_2O_8^{2-}$), hydrogen peroxide ($H_2O_2$), and/or ozone ($O_3$) oxidant. UV light, $TiO_2$, $OH^-$, or $H^+$ may be used to assist or enhance the oxidative process.

In an embodiment, an oxidation treatment and/or a grafting treatment to increase hydrophilicity of the separator membrane 100 may be performed at room temperature (20±5° C.) or heated and maintained at any constant temperature between 20 and 80° C.

In an embodiment, a plasma treatment to increase hydrophilicity of the separator membrane may include passing the membrane through a plasma gas. The plasma gas may be, for example, $O_2$, $N_2$, Ar, He, or $H_2$.

In an embodiment, an acid treatment to increase hydrophilicity of the separator membrane may include soaking the membrane in 0.1M to 30M acid solution for 1 min to 24 hrs. Acids used in the acid treatment may include HCl, $H_2SO_4$, HF, $H_2CO_3$, $HNO_3$, $H_3PO_4$, $C_2H_4O_2$, $HClO_4$, or HI.

In an embodiment, a radiation induced grafting treatment to increase hydrophilicity of the separator membrane 100 includes exposure of the separator to radiation (gamma, alpha, UV, electron beam) as an initiation process to graft molecules onto the surface (e.g. all surfaces exposed to or touching electrolyte, including external surfaces or faces and internal surfaces.

In an embodiment, the grafting treatment to increase hydrophilicity of the separator membrane may include using water insoluble organic and inorganic molecules that may have one or more functional groups wherein the functional groups include any one or more of $OH^-$ groups, $NH_2^-$ groups, $CH_3COO^-$ groups, siloxane (SiO), $SO_4^{2-}$, $CO_3^{2-}$, $NO_3^-$, carbonyl, and carboxy. Crosslinkers may be used to render molecules water insoluble.

Figure 4:
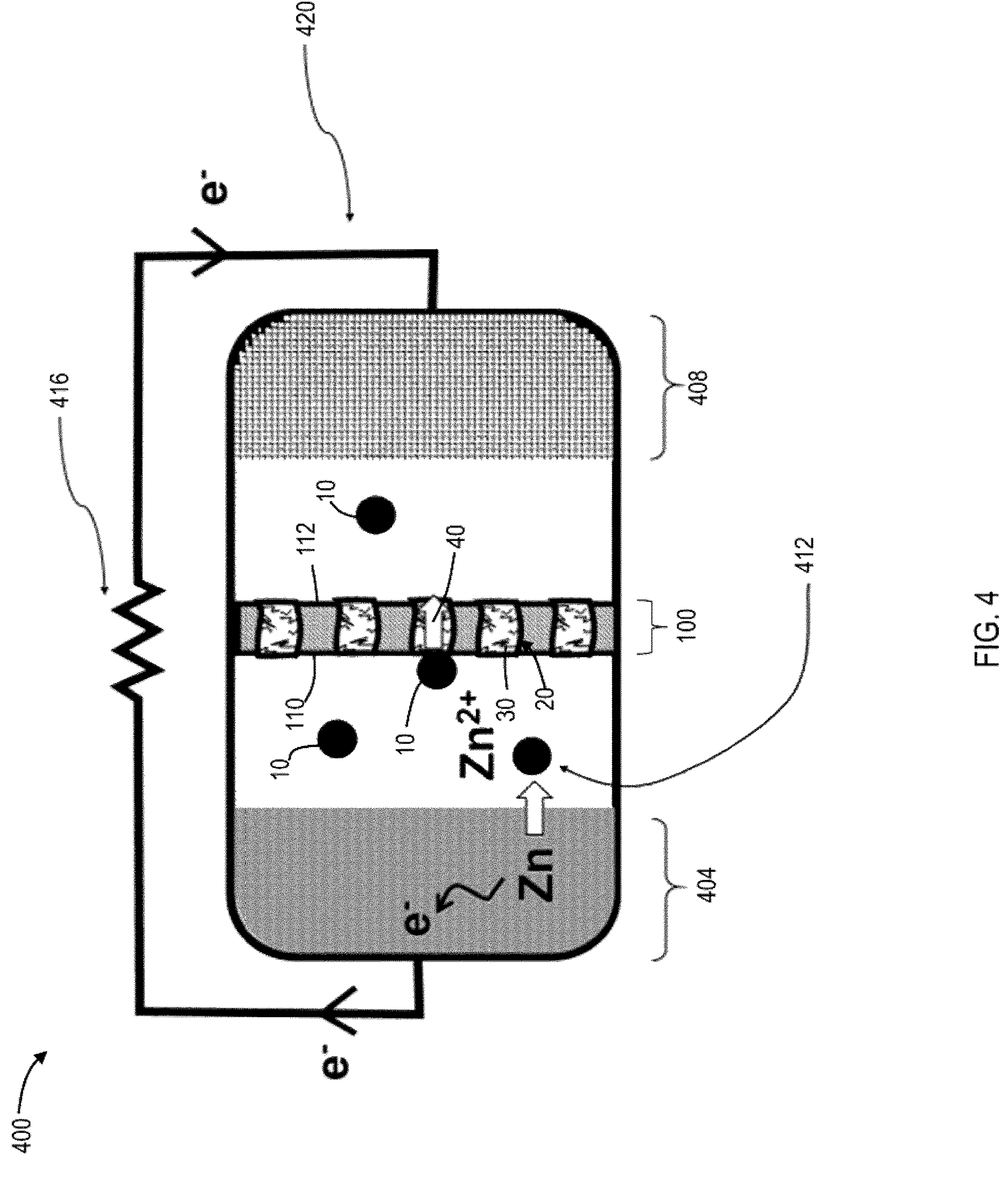
FIG. 4 is a two dimensional schematic representation of a zinc-ion cell including an embodiment of the separator of the present disclosure, where the separator includes one or more hydrophilic membranes, the negative electrode includes metallic zinc and the positive electrode includes a redox active material, according to an embodiment.

Referring now to FIG. 4, shown therein is a schematic representation of a zinc-ion cell 400 including the separator 100 of FIG. 1, according to an embodiment. The separator 100 comprises one or more hydrophilic membranes, such as described herein. In the representation of the zinc-ion cell of FIG. 4, the components are idealized representations and not necessarily drawn to scale.

The cell 400 includes a negative electrode 404 and a positive electrode 408. The negative electrode 404 and the positive electrode 408 are ionically connected by an electrolyte 412.

The negative electrode 404 includes metallic zinc.

The positive electrode 408 includes a redox active material.

The separator 100 is arranged in the cell 400 such that the separator is positioned between the negative electrode 404 and the positive electrode 408. The separator is configured to prevent physical contact between the negative electrode 404 and the positive electrode 408 (thereby preventing short circuits). The separator 100 is arranged such that the first edge 110 of the separator 100 faces the negative electrode 404 and the second edge 112 of the separator 100 faces the positive electrode 408. In some cases, the positioning of the separator 100 in the cell 400 may be such that the separator 100 is "sandwiched" between the negative electrode 404 and the positive electrode 408.

Generally, during discharge of the cell 400, an external circuit 420 delivers power to an electrical load 416. During discharge under the electrical load 416, zinc is stripped from the negative electrode 404 while $Zn^{2+}$ cations 10 migrate across the separator 100 and towards the positive electrode 408 through the electrolyte 412.

The separator 100 may provide various advantages, such as providing for proper wetting of the separator 100 by the electrolyte 412, providing good transport of $Zn^{2+}$ through the separator membrane 100, and preventing short circuits caused by zinc growth from the negative electrode 404 to the positive electrode 408. The separator 100 may be optimized to transport $Zn^{2+}$ quickly from one electrode to the other. The separator 100 may also improve the coulombic efficiency which is a measure of charge transfer efficiency.

The separator 100 includes a hydrophilic membrane. The hydrophilic membrane may include a plurality of hydrophilic membrane layers arranged in a layered configuration. The plurality of hydrophilic membrane layers may have the same properties, or some or all may have different properties. Properties may include any one or more of porosity, pore size, tortuosity, and thickness. Layers having different properties may be combined to provide a desired configuration or mix of beneficial properties. For example, an embodiment of the separator may include a thin, low porosity separator that provides a good physical barrier followed by a thick high porosity separator that serves as an electrolyte reservoir.

The separator 100 may be a hydrophilic membrane having a plurality of pores 20. The size of the pores 20 range from 0.1 to 1.3 μm. In particular, each pore 20 in the separator 100 may have an average diameter in the range of 0.1 to 1.3 μm. The average diameters of the pores 20 in the separator 100 may vary (i.e. be nonuniform) but fall within the range of 0.1 to 1.3 μm. The foregoing size range of the pores 20 may advantageously provide an increase in cycle life of the cell 400 and a high average coulombic efficiency.

The separator 100 may be treated to increase its hydrophilicity. Increasing the hydrophilicity of the separator 100 may improve the columbic efficiency of the cell. In one embodiment, the hydrophilicity of the separator 100 may be increased through one or more oxidative treatments of the separator 100.

The hydrophilic membrane may be a woven or nonwoven polymer. The hydrophilic membrane may include, for example, polyethylene, polypropylene, polyester, polypropylene, polyvinylchloride, poly tetrafluoroethylene, polyimide, polyimide, polyaramid, rubber, asbestos, cellulose, or glass fiber. The hydrophilic membrane may be mixed or functionalized with a ceramic material for hydrophilicity. The ceramic material may be, for example, $SiO_2$ or $Al_2O_3$.

The hydrophilic membrane may be configured to have a porosity of 20-90%. The hydrophilic membrane may be configured to have a tortuosity of 1-5.

The hydrophilic membrane may be configured to have a mechanical strength of 20-1500 gram-force resistance to withstand puncture from zinc metal.

The hydrophilic membrane has a high wettability with a contact angle less than 90° and a wicking time from 0 s-20 mins.

In this example, zinc metal is used as the negative electrode 404 and an intercalation material is used as the positive electrode 408.

The electrolyte 412 comprises zinc sulfate ($ZnSO_4$) dissolved in water ($H_2O$).

In this depiction the cell 400 is discharging under a load 416 and the zinc-ions 10 are transporting through the membrane 100 and intercalating into the positive electrode 408 active material.

The negative electrode 404 may include a layer of zinc metal. The negative electrode 404 may be a zinc alloy.

The electrolyte 412 may be in the form of a zinc salt dissolved in water and may contain a co-solvent. The salt solution may comprise of 0.1 to 10 molar zinc ions in the form of a zinc salt. The zinc salt may be zinc sulfate, zinc acetate, zinc citrate, zinc iodide, zinc chloride, zinc perchlorate, zinc bis(trifluoromethanesulfonyl)imide, zinc nitrate, zinc phosphate, zinc triflate, zinc tetrafluoroborate, or zinc bromide.

The electrolyte 412 may have a pH less than 7. The electrolyte 412 may preferably have a pH in the range of 4-6.

The positive electrode 408 may be an air electrode, an intercalation electrode, a conversion electrode, or an inert substrate at which redox molecules dissolved in the electrolyte 412 can be reduced/oxidized.

The zinc-ion cell 400 may be used as a primary (non-rechargeable) battery or as a component in a primary battery (such as with additional cells). The primary battery may be an alkaline battery, a zinc-carbon battery, a zinc-chloride battery, or a zinc-air battery.

The zinc-ion cell 400 may be used as a secondary (rechargeable) battery or as a component in a secondary battery (such as with additional cells). The rechargeable battery may be a zinc-air battery, a zinc-ion battery, a zinc-halide battery, a nickel-zinc battery, a zinc-iron battery, or a zinc-cesium battery.

Different membranes (e.g. for use as separator 100) have been tested for respective limiting current density, tortuosity, coulombic efficiency, porosity, membrane thickness, puncture test, and cycle life. The results are presented in Table 1.

Treating PE/$SiO_2$ membranes to increase hydrophilicity increased the limiting current density from 1 mAh/$cm^2$ to 5 mAh/$cm^2$ as well as the coulombic efficiency (CE) from 95.1% to 99.6%. Therefore, an increase in hydrophilicity leads to a higher rate capability for cells that utilize this membrane as well as increasing cycle life (120 to 197).

Furthermore, pore size studies were performed using cellulose membranes, which indicate an optimal pore size regime around 0.05-0.3 μm which results in high cycle life (~200) and high average coulombic efficiency (≥99.5%), with pores 0.65 μm having a reduction in average coulombic efficiency and cycle life.

TABLE 1

Analysis of different membranes using 1M $ZnSO_4$ for majority of tests.

| | | | Tests conducted in 1M $ZnSO_4$ electrolyte | | | | |
|---|---|---|---|---|---|---|---|
| Membrane | Puncture Resistance (gram-force) | Pore size (μm) | Porosity (%) | Tortuosity | Limiting current density* ($mA/cm^2$) | Cycle-life in Zn‖Ti cells** | Average CE (%) |
| Glass fiber | — | — | >90 | 1.8 | 10 | 29 | 99.5 |
| PE/$SiO_2$ (untreated) | 419 | 0.04 | 50 | 4.3 | 1 | 120 | 95.1 |
| PE/$SiO_2$ (treated) | — | 0.04 | 59 | 3.1 | 5 | 197 | 99.6 |
| Cellulose A | 419 | 0.05 | 57 | 2.3 | 1 | 127 | 97.4 |
| Cellulose B | 295 | 0.1 | 63 | 2.1 | 2.5 | 210 | 99.7 |
| Cellulose C | 91 | 0.3 | 79 | 1.3 | 2.5 | 221 | 99.5 |
| Cellulose D | 34 | 0.65 | 84 | 1.8 | 2.5 | 38 | 97.5 |
| Cellulose E | 182 | 1.2 | 86 | 1.8 | 5 | 28 | 95.5 |
| Nylon | 182 | 0.2 | 70 | 2.3 | 3.3 | — | — |

*The test for limiting current density was conducted in Ti‖Ti cells with 0.5M $Na_2SO_4$ electrolyte.

**The Zn‖Ti cells were cycled at 1 mA/$cm^2$ to a zinc plating capacity of 1 mAh/$cm^2$ and a voltage cut-off for stripping of 0.7 V until a short-circuit occurred. A short-circuit was evident by a higher stripping capacity (>1 mA/$cm^2$) than what was plated, indicating current being passed directly between the electrodes without a change in voltage.

Figure 5:
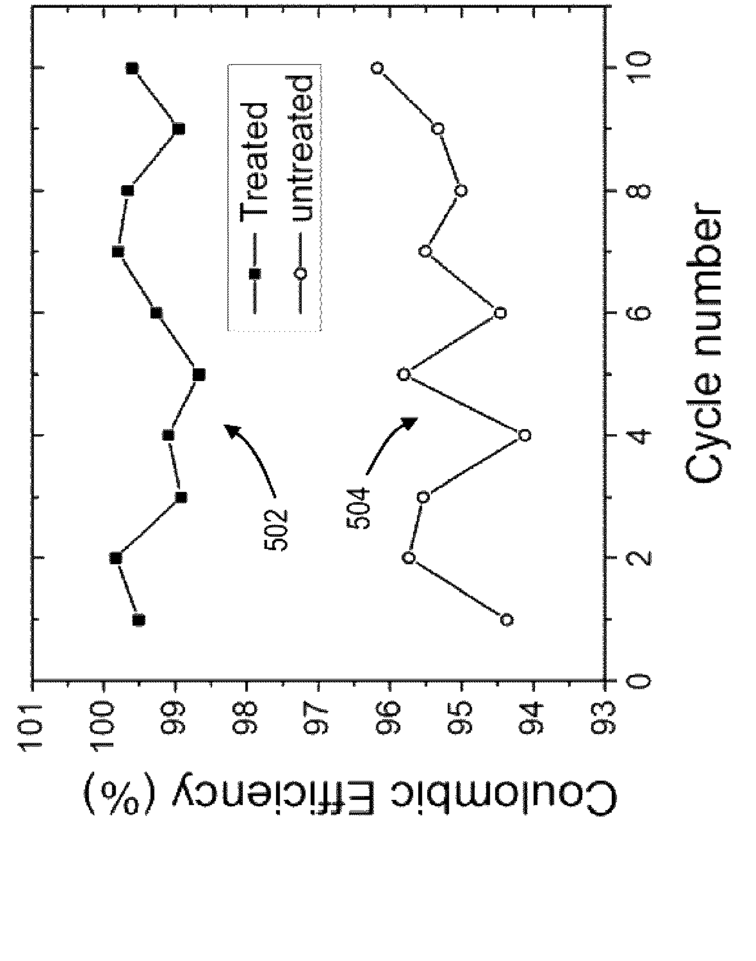
FIG. 5 is a graph illustrating plots of coulombic efficiency (%) versus cycle number for different separators measured in Zn||Ti cells with 1 M $ZnSO_4$ electrolyte.

Referring now to FIG. 5, shown therein is a graph 500 demonstrating plating and stripping of a Zn||Ti cell using a treated separator 502 (solid square) and untreated separator 504 (unfilled circle). In particular, FIG. 5 displays plots of coulombic efficiency (%) versus cycle number for different separators (treated and untreated) measured in Zn||Ti cells with 1 M ZnSO4 electrolyte.

In this example, the untreated separator 504 was a porous, high molecular weight polyethylene membrane imbedded with $SiO_2$ particles ($PE/SiO_2$) designed for use in Pb-acid batteries (purchased from Entek).

A high temperature ozonation in the presence of $H_2O_2$treatment was performed on the $PE/SiO_2$ membrane to form the treated separator 502.

The electrolyte included 1M $ZnSO_4$, zinc foil was used as the negative electrode, and a titanium plate was used as the positive electrode.

A current density of 1 mA/cm$^2$ was used for both plating and stripping. Zinc was plated onto the titanium substrate to a capacity of 1 mAh/cm$^2$ and then stripped to a cut-off voltage of 0.7 V vs. $Zn/Zn^{2+}$. This galvanostatic stripping experiment is equivalent to the reaction that would occur at the zinc electrode during discharge of a primary (non-rechargeable) cell.

The coulombic efficiency ("CE") was calculated as the measured capacity for stripped zinc (Qs) over the plated capacity (Qp=1 mAh/cm$^2$) for each cycle: CE=Qs/Qp×100.

The treated separator 502 (solid square) improves cycling performance by increasing the average CE to 99.6% from 95.1% in untreated separator 504 (unfilled circle). This increase in CE would lead to an increase in cycle life of a cell. It is suspected that the lower CE for the untreated separator 504 is a result of "dead" or inactive zinc metal in contact with locations on the separator which are hydrophobic and, thus, not wetted by the electrolyte.

It is also possible that $Zn^{2+}$ cations become trapped in hydrophobic regions within the pores of the separator. Either way, an improvement in the CE is further evidence of the benefits of increasing the hydrophilicity of the separator through oxidative treatments.

The following paragraphs describe the experimental methods used herein.

The separator in used in FIGS. 3 and 5 was a 190 μm thick, ultra-high molecular weight polyethylene imbedded with $SiO_2$ particles, herein referred to as $PE/SiO_2$ (in Table 1). This is a commercially available product which was purchased from Entek. This separator was used as is or treated to increase hydrophilicity (treatments described below). Membranes were presoaked in appropriate electrolyte before tests and had a porosity of 50% before any treatments were done.

Cellulose filter membranes (Table 1) were trimmed before use and purchased from Sigma Aldrich, having reported average pore sizes of 0.05 μm (VMWP09025), 0.1 μm (VCWP09025), 0.3 μm (PHWP09025), 0.65 μm (DAWP09025), and 1.2 μm (RAWP09025). Nylon filter membranes (Table 1) were purchased from Sigma Aldrich (cat. No. 7402-009). Glass fiber prefilter membranes were also purchased from Sigma Aldrich (cat. No. ap400700).

The treated, hydrophilic $PE/SiO_2$ separators in FIG. 3 were prepared by activating surface with $N_2$+$CO_2$ plasma gas at a rate of 2.5 m/min followed by acrylic acid and pentaerythriol triacrylate exposure using $N_2$ as the carrier gas.

The oxidized $PE/SiO_2$ separators used in FIG. 5 was prepared by soaking in an aqueous solution with $H_2O_2$ heated at 65° C. with ozone ($O_3$) bubbled through the solution. The separators were soaked overnight for 4 hours before being rinsed and dried.

Puncture tests, reported as puncture resistance (gram-force) in Table 1, were performed on dry membranes using a bic ballpoint pen on a Instron Model 4302 at room temperature.

Limiting current density (LCD) data from Table 1 was obtained by performing galvanostatic cycling with a potential limit on a Ti||Ti cell on a battery cycler (Biologic VSP 300) at room temperature. Each membrane was soaked in 0.5 M solution of $Na_2SO_4$ for 30 mins under sonication at room temperature or until fully soaked. The current density increased incrementally from 0.15 mA/cm$^2$ to 18 mA/cm$^2$ for a total of 19 measurements. Each current density was pulsed for 5 seconds in each direction (negative and positive current) and the limiting current density was determined. For current densities less than or equal to the LCD, the separator functions as a resistor and a constant voltage is observed for each current pulse. For current densities greater than the LCD, the voltage becomes sporadic during the current pulse.

Porosities reported in Table 1 were obtained by immersing a pre-weighed sample of separator in water and sonicating for 30 minutes. The weight gain after soaking was converted to a porosity value using the formula:

$$\text{porosity (\%)}=100*(m_w-m_i)/(\rho_w*V_s)$$

where $m_i$ and $m_w$ are the initial and wet masses, $\rho_w$ the density of the fluid used (here, water) and $V_s$ the volume of the separator sample.

Tortuosity is defined as the ratio of actual flow path length to the straight distance between the ends of the flow path, within the separator thickness. Tortuosity values reported in Table 1 were calculated using electrochemical impedance spectroscopy on a Zn||Ti cell with the series resistance Rs recorded (high frequency intercept) while increasing the number of separator layers from 1 to 5. The relationship between series resistance ($R_s$) and tortuosity ($\tau$) is described by the equation:

$$R_s=[(d/(\varepsilon\cdot A\cdot\kappa))\cdot\tau\cdot n_{layers}]+R_{contact}$$

where d is the thickness of the separator, $\varepsilon$ is the porosity, A is the area, $\kappa$ is the conductivity of the electrolyte and $R_{contact}$ a contact resistance.

$R_s$ increases linearly vs. $n_{layers}$—the number of separator layers stacked in the cell—and the tortuosity ($\tau$) can be determined from the slope.

For Zn||Ti cells (Table 1 and FIG. 5), the positive electrode for each cell was a titanium plate, the electrolyte was 1 M $ZnSO_4$, and negative electrode was a 30 μm thick dense zinc foil (purchased from Linyi Gelon LIB Co., Ltd.). All electrochemical cells (used in FIG. 5 and Table 1) were assembled using a homemade plate design including a rubber gasket sandwiched between two acrylic plates. The acrylic plates were bolted together and housed the electrode stack (negative/separator/positive). The electrode stack was compressed together between Ti plates by external screws which also served as electrical connections. The negative electrode was 5.5 cm×5.5 cm and the positive was 4 cm×4 cm. The separators were cut to 7 cm×7 cm. The Zn||Ti cells were all cycled on a CT2001A battery tester (Landt Instruments) at room temperature (23±2° C.).

While the above description provides examples of one or more apparatus, methods, or systems, it will be appreciated that other apparatus, methods, or systems may be within the scope of the claims as interpreted by one of skill in the art.

The invention claimed is:

1. A rechargeable battery comprising:

a negative electrode comprising zinc metal;

a positive electrode;

an electrolyte with pH in the range of 4-7 comprising water and dissolved zinc salts; and a separator interposed between the negative electrode and the positive electrode;

wherein the separator comprises a membrane layer;

wherein the membrane layer includes a first side facing the negative electrode and a second side facing the positive electrode;

wherein the separator includes a plurality of pores containing the electrolyte;

wherein the pores are connected to form a diffusion pathway from the first side to the second side; and wherein, during normal operation, zinc cations move between the negative electrode and the positive electrode through the separator;

wherein the membrane includes a plurality of molecules grafted onto one or more surfaces of the separator that contact the electrolyte.

2. The battery of claim 1, wherein the separator includes a plurality of membrane layers, wherein a composition a first membrane layer is distinct from a composition of a second membrane layer.

3. The battery of claim 1, wherein the membrane includes any one or more of $SiO_2$, $Al_2O_3$, or a ceramic material.

4. The battery of claim 3, wherein particles of at least one of $SiO_2$, $Al_2O_3$, or a ceramic material are suspended throughout the membrane.

5. The battery of claim 2, wherein the pores of the membrane are functionalized with a coating of $SiO_2$, $Al_2O_3$, or a ceramic material.

6. The battery of claim 1, wherein the membrane layer has a porosity of 20-90% and a tortuosity of 1-5.

7. The battery of claim 1, wherein the separator has a puncture resistance of 20-1500 gram-force.

8. The battery of claim 1, wherein a contact angle between the electrolyte and a membrane surface is less than 90°.

9. The battery of claim 1, wherein wicking time for the electrolyte into the membrane is in the range of 0s-20 mins.

10. The battery of claim 1, wherein the membrane is treated to increase hydrophilicity using an oxidative treatment.

11. The battery of claim 10, wherein the oxidative treatment includes an aqueous bath containing any one or more of persulfate ($S_2O_8^{2-}$), hydrogen peroxide ($H_2O_2$), and ozone ($O_3$) oxidant.

12. The battery of claim 1, wherein the plurality of molecules are grafted onto the surface using a grafting treatment, and wherein the grafting treatment includes water insoluble organic molecules or water insoluble inorganic molecules that have one or more functional groups including any one or more of an OH-group, a $NH_2^-$ group, a $CH_3COO^-$ group, a siloxane (SiO), $SO_4^{2-}$, $CO_3^{2-}$, $NO_3^-$, a carbonyl, and a carboxy.

13. The battery of claim 1, wherein the electrolyte comprises a zinc salt dissolved in water or water and a co-solvent to form a salt solution.

14. A method for fabricating a separator for use in a rechargeable zinc metal battery, wherein the rechargeable zinc metal battery comprises a membrane, wherein the membrane includes a plurality of pores that form a network that enables the diffusion of zinc cations through the membrane, the method comprising:

treating the membrane with an oxidative treatment;

wherein the membrane includes a plurality of molecules grafted onto one or more surfaces of the separator that contact the electrolyte.

15. The method of claim 14, wherein the oxidative treatment includes a plasma gas treatment.

16. The method of claim 14, wherein the oxidative treatment includes an acid treatment.

17. The method of claim 14, wherein the membrane includes a plurality of membrane layers, and wherein the method includes joining the plurality of membrane layers to form a separator.

18. A method for fabricating a separator for use in a rechargeable zinc metal battery comprising an electrolyte, wherein the rechargeable zinc metal batter comprises a membrane wherein the membrane includes a plurality of pores that form a network that enables the diffusion of zinc cations through the membrane, the method comprising:

grafting a plurality of molecules onto a surface of the membrane that contacts the electrolyte.

19. The method of claim 18, wherein the membrane is a hydrophilic membrane, and wherein the method further comprises mixing or functionalizing the hydrophilic membrane with a ceramic material.

* * * * *